(12) United States Patent
Takedomi et al.

(10) Patent No.: US 6,896,325 B2
(45) Date of Patent: May 24, 2005

(54) OCCUPANT PROTECTION APPARATUS

(75) Inventors: Akifumi Takedomi, Yokaichi (JP); Tadashi Tanaka, Asaka (JP); Masayoshi Kumagai, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/437,999

(22) Filed: May 15, 2003

(65) Prior Publication Data

US 2003/0222489 A1 Dec. 4, 2003

(30) Foreign Application Priority Data

Jun. 4, 2002 (JP) ........................................ 2002-163189

(51) Int. Cl.⁷ .............................................. B60N 2/42
(52) U.S. Cl. .............................. 297/216.1; 297/216.19; 297/284.11; 297/284.9; 280/730.2; 280/730.1
(58) Field of Search ........................ 297/216.1, 216.19, 297/284.11, 284.9; 280/730.2, 730.1

(56) References Cited

U.S. PATENT DOCUMENTS

| | | | | |
|---|---|---|---|---|
| 4,455,047 A | * | 6/1984 | Watanabe | 297/284.9 |
| 4,592,588 A | * | 6/1986 | Isono et al. | 297/284.6 |
| 4,834,322 A | * | 5/1989 | Wurst | 244/122 AG |
| 5,125,472 A | * | 6/1992 | Hara | 180/271 |
| 5,263,765 A | * | 11/1993 | Nagashima et al. | 297/284.6 |
| 5,570,716 A | * | 11/1996 | Kamen et al. | 137/223 |
| 5,695,242 A | * | 12/1997 | Brantman et al. | 297/216.1 |
| 5,967,603 A | * | 10/1999 | Genders et al. | 297/216.13 |
| 6,224,096 B1 | * | 5/2001 | Katsuda et al. | 280/736 |
| 6,236,920 B1 | * | 5/2001 | Hora | 701/45 |
| 6,296,292 B1 | * | 10/2001 | Feldman | 296/68.1 |
| 6,386,582 B2 | * | 5/2002 | Katsuda et al. | 280/736 |
| 6,533,318 B2 | * | 3/2003 | Yamaji et al. | 280/743.1 |
| 6,685,218 B1 | * | 2/2004 | Breed et al. | 280/730.2 |
| 2001/0011810 A1 | | 8/2001 | Saiguchi et al. | |

FOREIGN PATENT DOCUMENTS

| | | | | |
|---|---|---|---|---|
| FR | 2572034 A1 | * | 4/1986 | ............ B60N/2/50 |
| GB | 2 290 505 | | 1/1996 | |
| GB | 2 357 466 | | 6/2001 | |
| JP | 05229378 A | * | 9/1993 | ............ B60N/2/42 |

* cited by examiner

Primary Examiner—Laurie K. Cranmer
(74) Attorney, Agent, or Firm—Manabu Kanesaka

(57) ABSTRACT

An occupant protection apparatus protects an occupant sitting on a seat adjacent to a side door of a vehicle when a side collision or a rollover occurs. The occupant protection apparatus includes a push-up device for pushing up a part of a hip portion of the occupant adjacent to the side door when the side collision or the rollover occurs. In the occupant protection apparatus, when the side collision of the vehicle occurs, the push-up device pushes up the part of the occupant's hip to tilt an upper body of the occupant away from the side door. It is preferable that the push-up device includes an inflatable bag and a gas generator for inflating the bag.

3 Claims, 2 Drawing Sheets

OCCUPANT PROTECTION APPARATUS

BACKGROUND OF THE INVENTION AND RELATED ART STATEMENT

The present invention relates to an occupant protection apparatus for protecting an occupant in a vehicle when a side collision or a rollover of the vehicle occurs.

An occupant protection apparatus is provided for preventing an occupant from colliding with a side door and thereby protecting the occupant when a side collision (collision from a side of a vehicle) or a rollover of a vehicle occurs. The occupant protecting apparatus includes a side bag (side airbag) device, a curtain bag (curtain airbag) device, and the like. In the specification, the term "rollover" includes a spinning of the vehicle, and "side collision or rollover" is sometimes described simply as "side collision"

An object of the present invention is to provide an occupant protection apparatus for moving an upper body of the occupant away from a door when the side collision occurs.

Further objects and advantages of the invention will be apparent from the following description of the invention.

SUMMARY OF THE INVENTION

According to the present invention, an occupant protection apparatus protects an occupant sitting on a seat adjacent to a side door of a vehicle when a side collision or a rollover occurs. The occupant protection apparatus includes push-up means for pushing up a hip portion of the occupant adjacent to the side door when the side collision or the rollover occurs.

In the occupant protection apparatus, when the side collision of the vehicle occurs, the push-up means pushes up the occupant's hip adjacent to a side bag so as to tilt an upper body of the occupant away from the side bag. Accordingly, a space between the door and the upper body of the occupant increases, so that the upper body of the occupant does not easily collide with the side door, and receives only a small impact even if the occupant collides with the side door.

It is preferable that the push-up means for pushing up the hip comprises an inflatable bag and a gas generator for inflating the bag. When the side collision is detected or predicted, the gas generator is activated so as to inflate the bag. More specifically, the gas generator instantaneously generates a large amount of gas, so that when the side collision occurs, the occupant's hip adjacent to the door is sufficiently pushed up and a large space is provided between the upper body of the occupant and the door.

An airbag may be provided to expand in the large space between the side door and the upper body of the occupant for receiving and protecting the occupant. Due to the large space, it is possible to increase a thickness of the airbag in an inflated state, so that the airbag can more effectively absorb an impact. Further, it is possible to inflate the airbag quickly even when an inflator having a low output is used.

BRIEF DESCRIPTION OF THE DRAWINGS

FIGS. 2(a) and 2(b) are sectional views taken along line 2—2 in FIG. 1, wherein FIG. 2(a) is a view showing a state before a bottom bag is inflated, and FIG. 2(b) is a view showing a state after the bottom bag is inflated.

DETAILED DESCRIPTION OF PREFERRED EMBODIMENTS

Figure 1:
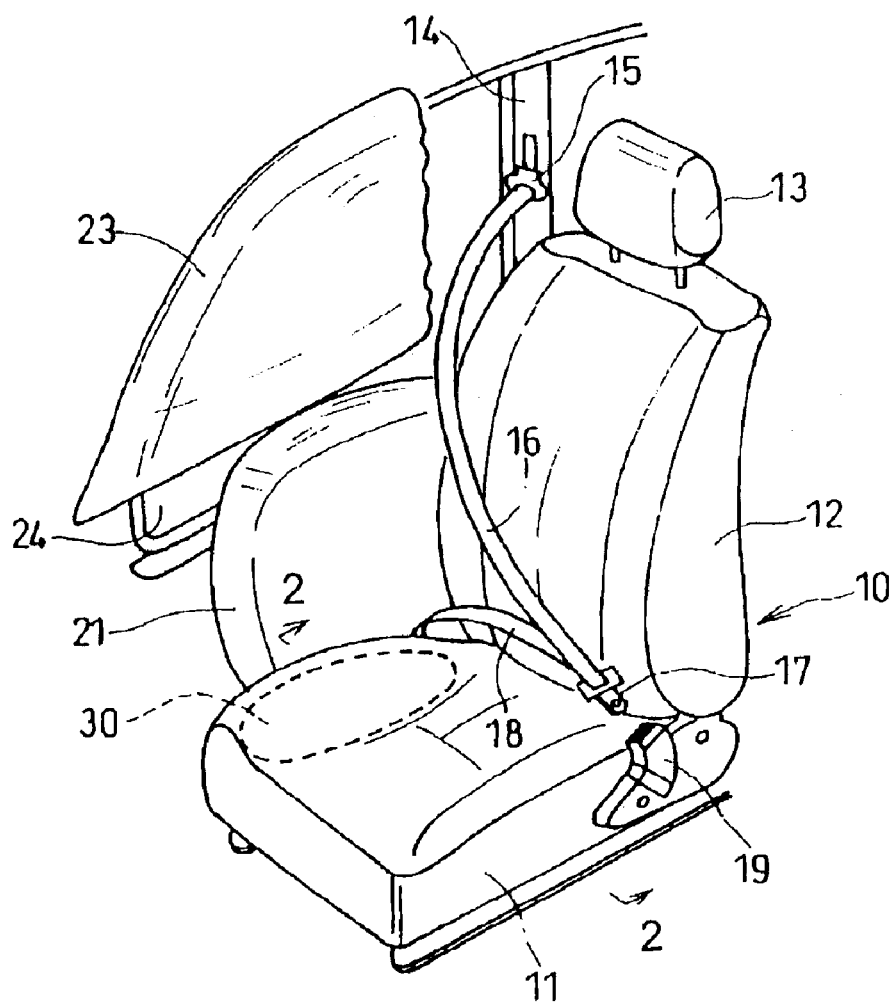
FIG. 1 is a perspective view showing a front seat of an automobile including an occupant protection apparatus according to an embodiment.
Figure 2A:
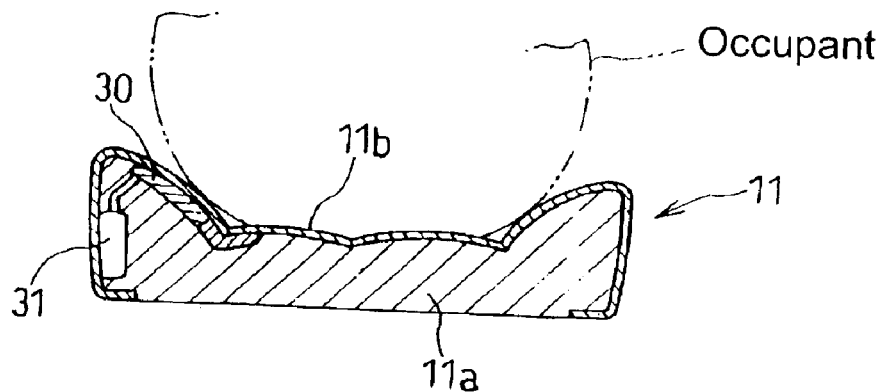
Figure 2B:
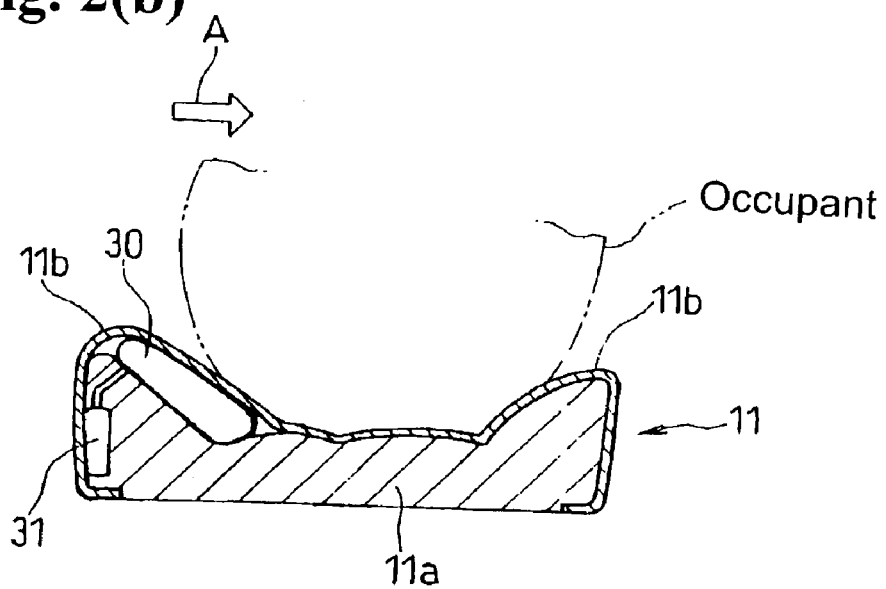

Hereunder, embodiments of the present invention will be described with reference to the accompanying drawings. FIG. 1 is a perspective view showing a front seat of an automobile including an occupant protection apparatus according to an embodiment. FIGS. 2(a) and 2(b) are sectional views taken along line 2—2 in FIG. 1, wherein FIG. 2(a) is a view showing a state before a bottom bag is inflated, and FIG. 2(b) is a view showing a state after the bottom bag is inflated.

As shown in FIG. 1, a seat 10 of an automobile includes a seat cushion 11, a seat back 12, and a headrest 13. A shoulder anchor 15 is provided on a B-pillar 14, and a shoulder belt 16 extends from the shoulder anchor 15. The shoulder belt 16 is inserted though a tongue 17, and accordingly serves as a lap belt 18. The tongue 17 is locked to a buckle 19.

A door 24 or the seat 10 is provided with a side bag device including a side bag 21 for inflating along a bottom portion of the door 24. In addition, a curtain bag device extending from an A-pillar along a roof side of the automobile is provided. When a side collision or a rollover occurs, a curtain bag 23 inflates along an upper portion of the door 24. Although only a front portion of the curtain bag 23 is shown in FIG. 1 in order to make the figure clear, the curtain bag 23 actually extends so as to cover the B-pillar 14 in an inflated state. The curtain bag 23 may be large enough to cover the door of the back seat.

As shown in FIGS. 2(a) and 2(b), the seat cushion 11 includes a main cushion body 11a composed of a foam material and a cover 11b for covering top and side surfaces of the main cushion body 11a. An inflatable bottom bag 30 is disposed between the main cushion body 11a and the cover 11b of the seat cushion 11 at an upper portion along a side close to the door 24. In addition, an inflator 31 for inflating the bottom bag 30 is disposed in the seat cushion 11.

When the right side of the automobile collides with an object or when the automobile rolls over to the right, the side bag 21 and the curtain bag 23 inflate along the door 24. In addition, as shown in FIG. 2(b), the inflator 31 inflates the bottom bag 30. When the bottom bag 30 is inflated, the right hip of the occupant sitting on the seat 10 is pushed up, so that the upper body of the occupant tilts away from the door 24 in the arrow direction A, and a space between the upper body of the occupant and the door 24 increases. Accordingly, the side bag 21 and the curtain bag 23 inflate so as to expand into the space. The side bag 21 receives and protects the shoulder and the hip of the occupant from the right, and the curtain bag 23 receives and protects the head and the neck of the occupant.

According to the above-described embodiment, the upper body of the occupant is tilted toward the left by the bottom bag 30, and the large space is provided between the upper body of the occupant and the door 24. Accordingly, it is possible to increase thicknesses of the side bag 21 and the curtain bag 23 (sizes thereof in a direction perpendicular to the door in the inflated state), so that the impact on the occupant can be more effectively absorbed. In addition, even when the inflators for inflating the side bag 21 and the curtain bag 23 have low outputs, the side bag 21 and the curtain bag 23 can be inflated smoothly and quickly.

In the above-described embodiment, the bottom bag 30 for tilting the upper body of the occupant away from the door 24 is disposed in the seat cushion 11. Another bag may be disposed in the seat back 12 at the side close to the door 24 for a similar purpose.

In the embodiment, the side bag 21 and the curtain bag 23 are provided. However, it is possible to omit one of the side bag 21 and the curtain bag 23. When only the side bag is provided, the side bag may also be constructed to expand further upward as compared to that shown in the figure. When only the curtain bag is provided, the curtain bag may be constructed to expand downward further then that shown in the drawing.

In the embodiment, the bottom bag 30 is constructed to push up the cover 11*b* in an inflated state. However, the bottom bag 30 may also be constructed to break the cover 11*b* and directly push up the occupant's hip in an inflated state.

Although not shown in the figure, the seat itself may be tilted to tilt the upper body of the occupant away from the door when the side collision occurs.

Although a right seat is shown in the above-described embodiment, the present invention may also be applied to a left seat. In addition, although the present invention is applied to a front seat in the embodiment, the present invention may also be applied to a back seat.

As described above, according to the present invention, the upper body of the occupant is tilted away from the door to protect the occupant when the side collision occurs. In case that the space between the occupant and the door is increased and the airbag is inflated in the space to protect the occupant, the airbag can inflate sufficiently quickly even when the gas generator for inflating the airbag has low output. In addition, the thickness of the airbag in the inflated state can be increased.

While the invention has been explained with the specific embodiments of the invention, the explanation is illustrative and the invention is limited only by the appended claims.

What is claimed is:

1. An occupant protection apparatus for protecting an occupant, comprising:
   a seat situated adjacent to a side door of a vehicle,
   push-up means disposed inside the seat and including an inflatable bag situated at a door side of the seat and a gas generator attached to the inflatable bag for inflating the same, said inflatable bag being provided less than a half of the seat in a width direction of the seat to be inflated by the gas generator for pushing up a part of a hip portion of the occupant adjacent to the side door, said seat being inclined upon inflation of the inflatable bag such that the door side is located higher than an opposite side thereof in the width direction to form a greater space between the side door and the occupant when a side collision or a rollover occurs, and
   an airbag disposed inside the vehicle for expanding in the greater space between the side door and the occupant created by the push-up means when the side collision or the rollover occurs.

2. An occupant protection apparatus for protecting an occupant, comprising:
   a seat situated adjacent to a side door of a vehicle,
   push-up means disposed inside the seat, and including an inflatable bag situated at a door side of the seat and a gas generator attached to the inflatable bag for inflating the inflatable bag and activated only when a side collision or rollover is detected or predicted, said inflatable bag being situated only at the door side of the seat and inflated by the gas generator for pushing up a part of a hip portion of the occupant adjacent to the side door to form a greater space between the side door and the occupant when a side collision or a rollover occurs, and
   an airbag disposed inside the vehicle for expanding in the greater space between the side door and the occupant created by the push-up means when the side collision or the rollover occurs.

3. An occupant protection apparatus according to claim 2, wherein said airbag is at least a side bag or a curtain bag.

* * * * *